United States Patent [19]

Miyoshi et al.

[11] 4,118,993
[45] Oct. 10, 1978

[54] MECHANISM FOR CONVERTING ROTARY MOTION INTO LINEAR RECIPROCATING MOTION

[75] Inventors: Noriomi Miyoshi; Michihiko Tsuruoka, both of Kawasaki, Japan

[73] Assignee: Fuji Electric Co., Ltd., Kawasaki, Japan

[21] Appl. No.: 778,540

[22] Filed: Mar. 17, 1977

[51] Int. Cl.² .................................... F16H 19/06
[52] U.S. Cl. .................................................. 74/37
[58] Field of Search ........................................ 74/37

[56] References Cited

U.S. PATENT DOCUMENTS 2,728,238  12/1955  Pasache .................................. 74/37

FOREIGN PATENT DOCUMENTS 1,356,766  2/1964  France .................................. 74/37

Primary Examiner—Benjamin W. Wyche
Assistant Examiner—Wesley S. Ratliff, Jr.
Attorney, Agent, or Firm—Sughrue, Rothwell, Mion, Zinn and Macpeak

[57] ABSTRACT

A rotary to linear reciprocating motion converter includes an endless chain 5 coupled to spaced drive and driven sprockets 3, 4, an output rod 8 slidably disposed on a guide bar 6 via a slide member 7, and a connecting rod 16 coupled between a chain link and the upper end of the output rod by pivot pins 17, 18. Rotational moments about the guide bar are absorbed by a roller 11 journalled on a shaft 10 extending out from the slide member 7 being slidably disposed in a slot 13 in the sidewall of the mechanism housing.

7 Claims, 5 Drawing Figures

MECHANISM FOR CONVERTING ROTARY MOTION INTO LINEAR RECIPROCATING MOTION

BACKGROUND OF THE INVENTION

1. Field of the Invention

This invention relates to a mechanism for converting rotary motion into linear reciprocating motion, and more particulary to such a mechanism employing an endless chain disposed on spaced drive and driven sprockets, a slide member linearly movable on a guide rod mounted parallel to said chain, and a connecting rod pivotally coupled between said chain and said slide member.

2. Description of the Prior Art

There are a number of prior art mechanisms for converting rotary motion to linear reciprocating motion without repeatedly changing the rotational direction of the drive source, such as a crank arm system or the like. In a crank system, however, the reciprocation stroke is determined by the diameter of the drive disc or the length of the crank arm, which imposes a severe limitation where a desired stroke is needed and the space available for the mechanism will not accomodate a sufficiently large crank disc/arm.

In order to eliminate this drawback, a converting system as shown in FIG. 4 has been developed. In this Figure, reference numeral 51 designates a rotary drive pulley for a belt 52 coupled between the drive pulley and a driven pulley (not shown) spaced therefrom. A linear guide plate 53 and a slide member 54 mounted on the guide plate are disposed between the belt runs. A traveller 55 and a pinch rod 56 are pivotally mounted to the main slide member 54. The pinch rod 56 has arms 561, 562 and 563. Reference numerals 57 and 58 designate fixed stoppers. In this system, when the drive pully 51 rotates in the direction shown by the arrow, the belt 52 also moves in the same direction. The pinch rod 56 is biased in either one of two rotational positions by a stop pin 60 and a spring 59 mounted on the slide member 54. The latter moves toward the left, and when the arm 563 engages the stopper 57 at the left end, the pinch rod 56 cams in the stop pin 60 and rotates in a clockwise direction. This releases the upper belt run from the traveller 55 and the arm 562, and transfers the pinch engagement to the lower belt run, between the traveller 55 and the arm 561. Thus, the main slide member 54 moves in the reverse direction or toward the right. At the end of this stroke the arm 563 strikes the other stopper 58, the arm 562 engages the upper belt run again, and the main slide member 54 moves back in the left direction, thus converting the rotation of the drive pulley 51 to the linear reciprocation of the slide member 54.

Since this linear reciprocating motion is implemented by alternately switching the coupling between the pinch rod and the belt, however, the mechanism is relatively complicated, and high speed operation becomes quite rough and jerky. Further, since the pinch rod and traveller are disposed between the drive and driven pulleys the full belt run cannot be effectively utilized, and for a given linear stroke the space requirements are increased by more than twice the diameters of the pulleys. Also, the repeated belt pinching causes rapid wear and necessitates frequent belt replacement.

SUMMARY OF THE INVENTION

It is therefore an object of this invention to provide a mechanism for converting rotary motion into linearly reciprocal motion wherein constant drive belt or chain engagement is maintained, and wherein the full run of the drive chain between a drive pulley and a driven pulley is effectively utilized to thereby increase the reciprocation stroke.

DETAILED DESCRIPTION OF THE PREFERRED EMBODIMENT

Figures 1, 2A, 2B:
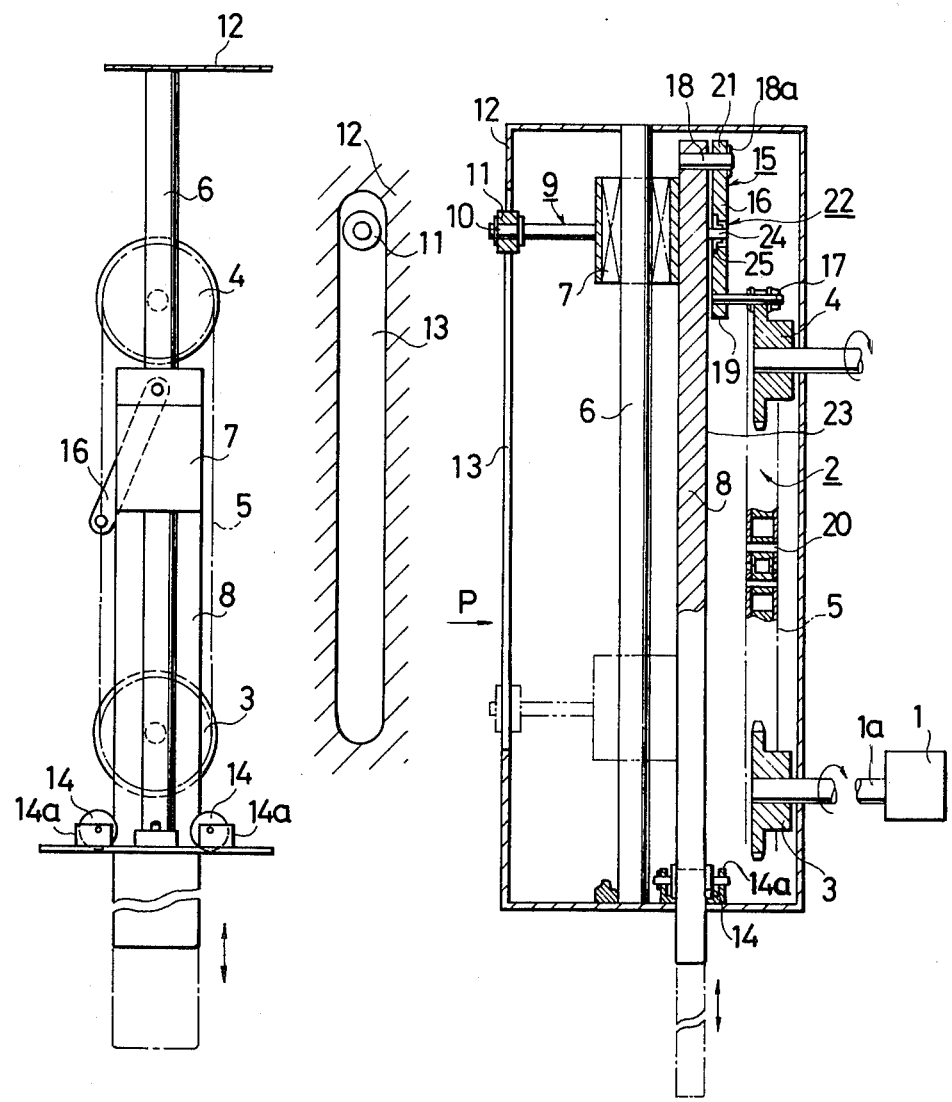
FIG. 1 shows an elevation of a mechanism for converting rotary motion into linearly reciprocal motion according to this invention.
FIG. 2A shows a side view of FIG. 1, partly in section.
FIG. 2B shows a partial schematic view from the direction of arrow P in FIG. 2A.

Referring now to FIG. 2A, motor 1 drives a transmitting means 2 comprising a drive sprocket 3 connected to the motor via a shaft 1a, a driven sprocket 4, and an endless chain 5 coupled between the sprockets. A linear guide bar 6 is disposed parallel to the runs of the chain 5 and opposite the center axes of the drive and driven sprockets, and a slide member 7 is disposed on the bar 6 and journalled by ball bearings. A linearly reciprocating output rod 8 is fixed at its upper end to the slide member 7, whereby the rod 8 is guided on the bar 6.

A stop guide 9 comprises a shaft 10 fixed to and extending outwardly from the slide member 7, and a roller 11 rotatably mounted on the end of the shaft. The stop guide 9 not only confines the slide member 7 to linear motion, but also prevents it from rotating about the guide bar 6. The roller 11 is slidably disposed in a slot 13 in a side plate 12 of the housing, as shown in FIG. 2B. A pair of flanged guide rollers 14 (FIG. 1) are mounted on the lower portion of the housing in chocks 14a adjacent an opening for the output rod 8, and prevent the latter from vibrating during its travel as well as suppress vibrational chattering of the slide member 7.

A coupling mechanism 15 adjacent the upper portion of the output rod 8 transmits the motion of the chain 5 to the rod, and comprises a connecting rod 16 and a pair of pivot pins 17 and 18. One end 19 of the rod 16 is rotatably coupled to the chain 5 by the pin 17 disposed perpendicular to the chain. The pin 17 also serves as one of coupling pins 20 for the chain links. The other end 21 of the connecting rod 16 is rotatably coupled to the output rod 8 by the pin 18 disposed perpendicular to the rod 8. The pin 18 is secured by a mounting ring 18a which prevents its withdrawal. The chain 5 and the output rod 8 are thus always coupled together by the connecting rod 16. Reference numeral 22 designates a member for preventing sudden deformations in the coupling mechanism when a load is added to or removed from the output rod 8. To prevent the deformation of the pivot pins 17 and 18, for example, the rod 16 is provided with a roller 24 journalled on a shaft 25. The roller 24 is designed to rotate when in contact with the surface 23 of the output rod 8, whereby it functions to effect the smooth arc-like travel of the connecting rod 16 about the pivot pin 18.

Figure 3:
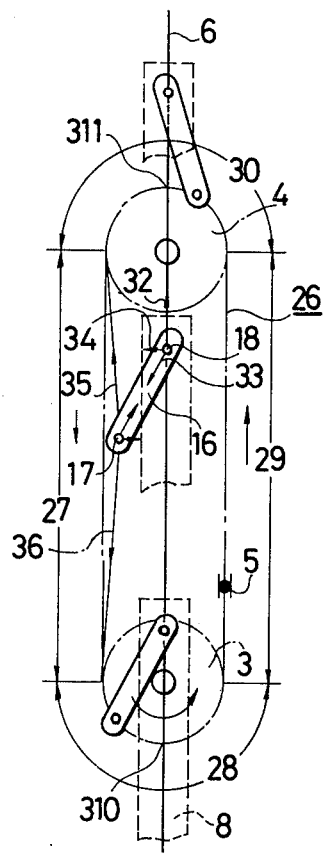
FIG. 3 shows a simplified operational diagram of the invention.
Figure 4:
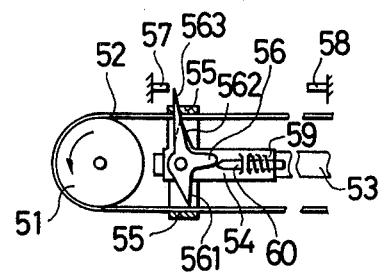
FIG. 4 shows a fragmentary sectional view of a conventional mechanism.

Referring now to FIG. 3, in operation, when the drive sprocket 3 rotates in a counter-clockwise direction, the chain 5 also rotates in the same direction while rotating the driven sprocket 4. The pivot pin 17 moves in a locus or path 26 (shown by a dotted line) corresponding to the shape of the chain 5. The output rod 8 is pulled down along the guide bar 6 by the connecting rod 16 and the pivot pin 18 as the pivot pin 17 moves down the linear chain run 27. When the pin 17 reaches and travels along the lower circular area 28 of its path the connecting rod 16 rotates about the pin 18 in the manner of a crank arm, and changes direction as it passes through the lower dead center point 310 whereat the pins 17 and 18 are axially alligned with the output rod 8. The rod 8 is thereafter pushed upwards as the pin 17 moves along the other linear chain run 29. In the upper circular area 30 the same direction reversal operation takes place as in the lower area 28, whereafter the output rod 8 is again pulled down after the pin 17 passes through the upper dead center point 311. In this manner, the rotary motion of the drive sprocket 3 and the chain 5 is converted into a linear reciprocal motion of the output rod 8.

The coupling mechanism 15 is thus simple in construction since it basically only comprises the two pivot pins 17 and 18 and the connecting rod 16. Further, since the chain 5 and rod 8 are always connected together by the coupling mechanism 15, even during the directional changes of the output rod, it is not necessary to repeatedly reverse the engagement with the drive chain. Since it is not necessary to arrange the coupling mechanism 15 directly between the drive sprocket 3 and the driven sprocket 4, the full linear chain runs can be converted into linear reciprocal motion whose stroke is equal to the distance between the sprocket axes, whereby the overall size of the mechanism is greatly reduced.

When a load is applied to the output rod 8 as designated by the arrow 32, a tension force 33 acts in the direction of a line drawn between the pivot pins 17 and 18. The lateral component 34 of the tension force 33 acts as a moment to rotate the pin 18 and the slide member 7 about the guide bar 6. Such rotation is prevented by the stop guide 9, however, and thus the slide member 7 and the output rod 8 continue to move smoothly without any lateral vibration.

Although the lateral force component 34 is also applied to the chain 5, such force is automatically balanced by the inward deflection of the chain run, as seen in FIG. 3. In this state, tension forces 35 and 36 act on the chain 5, and these forces are relatively large in comparison with the load 32. However, such tension forces are relatively small in comparison with the normal or design forces applied to the chain, and therefore they may be ignored.

In the disclosed embodiment, although a ball bearing journal has been shown for the slide member 7, the latter may instead be splined to the guide bar 6, in which case the rotation preventing stop guide 9 is unnecessary.

Further, the guide bar 6 has been shown as being centrally positioned parallel to the chain 5 and equidistant from the linear runs of the chain. However, if the load is always applied only on one side (for example, the side designated by 27) of the chain run, the guide bar, slide member, and output rod can be positioned directly opposite (behind) said run so as to more effectively offset such load, whereby the lateral force applied to the connecting rod 16 is almost negligible and the chain load can thus be increased.

What is claimed is:

1. In a mechanism for converting rotary motion into linear reciprocating motion including a drive sprocket, a driven sprocket spaced therefrom, an endless chain coupled between said drive and driven sprockets, a rotary power source operatively coupled to said drive sprocket, a guide bar disposed parallel to the linear runs of said chain, a slide member slidably engaged with said guide bar, and means for coupling said chain member with said slide member, the improvement characterized by:

(a) said guide bar being spaced from the plane of said chain,
    (b) an elongated output rod secured to said slide member,
    (c) said coupling means comprising an elongated connecting rod, first means pivotally coupling one end of said connecting rod to said chain, second means pivotally coupling the other end of said connecting rod to said output rod, roller means spaced from said second means on said connecting rod for providing a rolling contact between said connecting rod and said output rod, and
    (d) means for preventing the rotation of said slide member about said guide bar.

2. A mechanism as defined in claim 1, wherein said guide bar and said second means are centrally disposed equidistant from said chain runs.

3. A mechanism as defined in claim 1, wherein said guide bar is disposed in an offset manner more proximate one of said chain runs than the other.

4. A mechanism as defined in claim 1, wherein said rotation preventing means comprises a housing surrounding said mechanism, an elongated slot in said housing parallel to said guide bar, a shaft member fixed to said slide member and extending outwardly therefrom and into said slot, and a roller rotationally mounted on the end of said shaft and disposed in said slot.

5. A mechanism as defined in claim 1, wherein said rotation preventing means comprises said guide bar and said slide member being slidably splined together.

6. A mechanism as defined in claim 1, wherein said first pivotal coupling means comprises an extended hinge pin for two of said chain links.

7. A mechanism as defined in claim 1, further comprising a housing surrounding said mechanism, an opening in said housing through which said output rod extends, and guide roller means mounted to said housing adjacent said opening for guiding said output rod during its reciprocating movement to thereby prevent vibration and chattering in the mechanism.

* * * * *